Aug. 28, 1956 F. F. DOWNEY ET AL 2,760,551
METHOD AND APPARATUS FOR ASSEMBLING AND SEALING
PLASTIC CLOSURE MEMBERS IN PLASTIC BOTTLES
Filed March 1, 1952 3 Sheets-Sheet 2
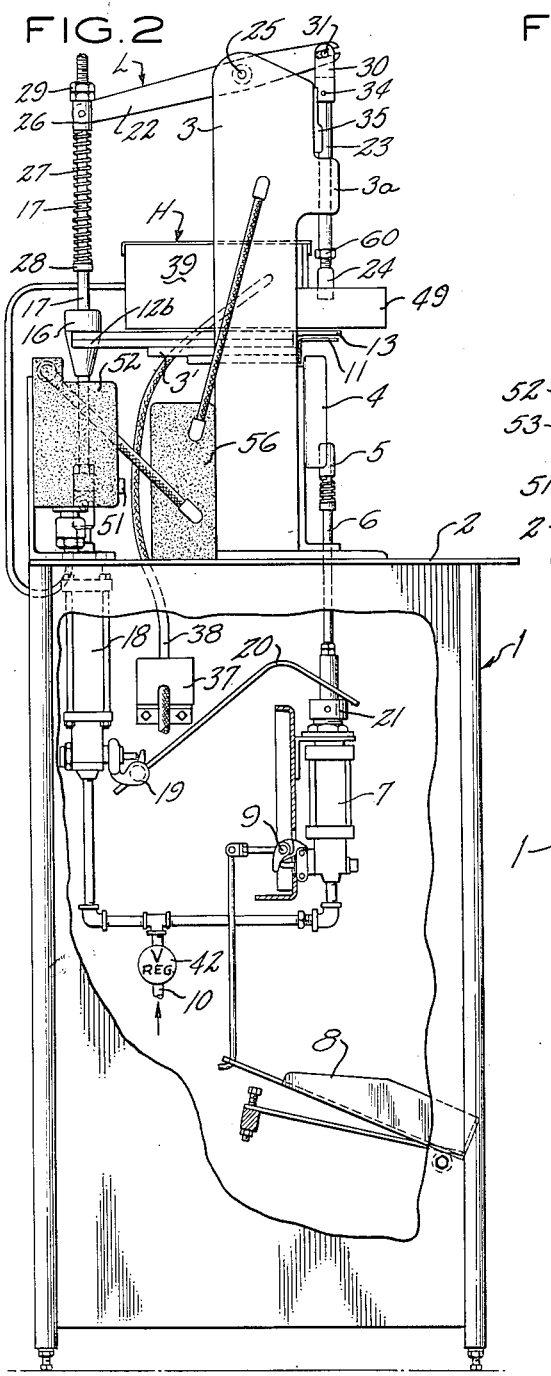
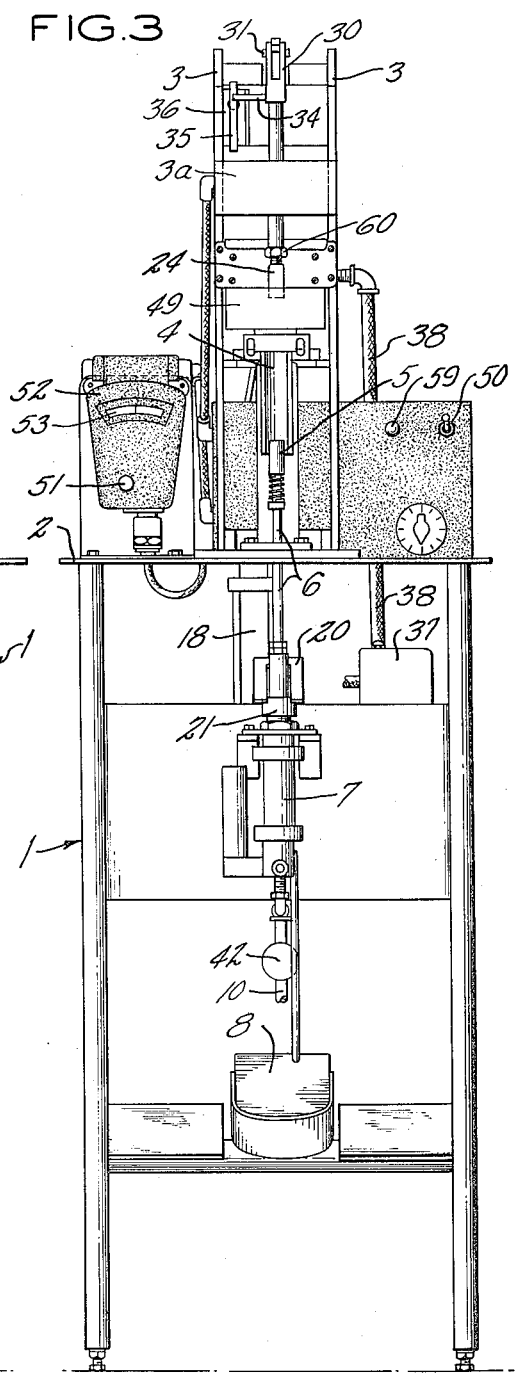
INVENTORS
FRANCIS F. DOWNEY
JOHN H. DuBOIS
EDWARD H. LORENZ
BY *Parham & Bates*
ATTORNEYS

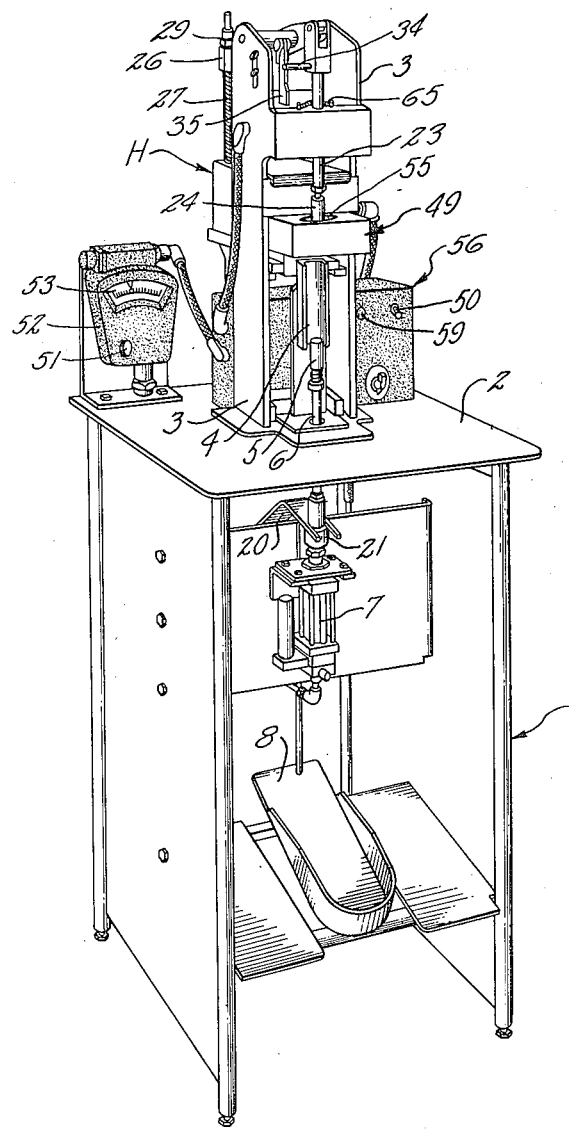

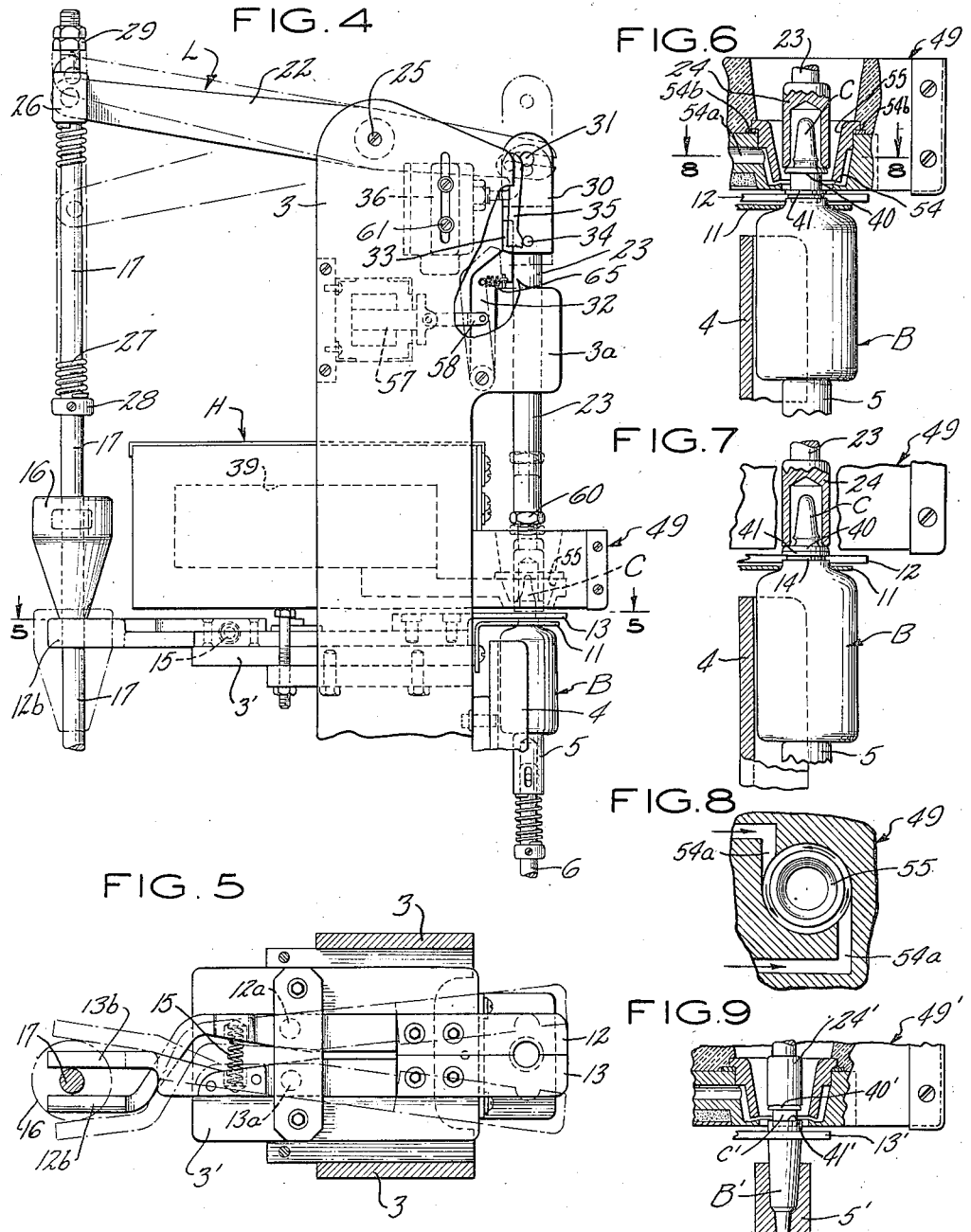

United States Patent Office 2,760,551
Patented Aug. 28, 1956

2,760,551

METHOD AND APPARATUS FOR ASSEMBLING AND SEALING PLASTIC CLOSURE MEMBERS IN PLASTIC BOTTLES

Francis F. Downey, Granby, and John H. Du Bois and Edward H. Lorenz, West Hartford, Conn., assignors to Emhart Manufacturing Company, Hartford, Conn., a corporation of Delaware Application March 1, 1952, Serial No. 274,466

7 Claims. (Cl. 154—42)

The present invention relates to sealing plastic plugs in plastic tubular members and particularly in plastic bottles so that the closure is leak-proof and permanent.

The invention also provides for the sealing of special dispenser or discharge control members in the necks of such bottles or for the sealing of a bottom closure or base in a plastic bottle or container initially formed with an open bottom. In the latter case, a particular discharge controlling structure may be integrally molded at the top of the container rather than inserted as a separate member and sealed in the neck portion of the container.

In addition to providing a permanent and leak-proof seal, the invention may be employed to render the assembly non-refillable.

It therefore is a principal object of the invention to provide an improved method and apparatus for assembling and sealing the plastic closure members in plastic bottles, containers and other tubular plastic structures.

Other objects and advantages will be apparent from the following description of the embodiments of the invention illustrated in the accompanying drawings, in which:

Figure 1 is a perspective view of a machine embodying the invention;

Fig. 2 is a side elevation of the machine shown in Fig. 1 with a portion of a cabinet wall broken away to show interior mechanism;

Fig. 3 is a front elevation of the machine shown in Figs. 1 and 2;

Fig. 4 is an enlarged view of the upper portion of Fig. 2 with the mechanism in a different position of its operational cycle;

Fig. 5 is a cross-sectional view taken on line 5—5 of Fig. 4 showing the extreme positions of bottle gripping jaws;

Figs. 6 and 7 are enlarged views of the bottle and cap and the adjacent portions of bottle gripper, plug inserter and heater components of the machine shown in Fig. 4 in successive positions of their operations and with portions of Fig. 6 in cross-section to show the internal arrangement of the heater;

Fig. 8 is a cross-sectional view taken on line 8—8 of Fig. 6; and

Fig. 9 is a view similar to Fig. 6 showing the adaptation of the machine to plug sealing the open bottom of a plastic container.

Referring to the drawings, the machine there disclosed for assembling and sealing a thermoplastic closure C in the neck or open tubular portion of a thermoplastic bottle B generally comprises a heater H for heating the surface of the closure C which is to engage and be welded to the neck of the bottle B, and a load-applying mechanism generally designated L for pressing the closure successively into presealing and sealing engagement with the bottle neck.

More particularly, as shown in Figs. 1–3, the machine includes a base cabinet table 1 to the top 2 of which is secured an upright frame 3 having a bottle guide 4 for directing the vertical travel of the bottle B and closure C combination (Fig. 4). The bottle B with the plug closure C inserted part way into its neck is placed on a lift member 5 and against the guide 4. In the embodiments illustrated in the drawings, the partial insertion of the plug closure C in the bottle neck and the placing of the assembly on the lift 5 is effected manually although it is intended that these operations may be effected by suitable automatic or semi-automatic mechanism (not shown) if desired.

The lift member 5 is secured to a vertically disposed rod 6 which extends downwardly through a guide in the table 2 and is vertically reciprocated by an air motor 7 so as to raise and lower the supported bottle B into and out of sealing position (Fig. 6) relative to the heater H. As shown in Fig. 2, air or other operating pressure medium is supplied to the motor 7 to raise the lift 5 responsive to the depression of a foot pedal 8 which operates a two-way valve 9 in a pressure supply line 10 so that air is supplied to the motor 7 which automatically raises the bottle B to the sealing position (Fig. 4) where it is located by engagement of the shoulder of the bottle with a centering plate 11 which is secured to a bracket 3' on the frame 3.

Spring operated jaws 12 and 13 are provided which automatically close and grip an annular groove or bead 14 molded into the bottle neck so as to more firmly support the bottle after it has been located in the sealing position.

As shown in Figs. 4 and 5, the jaws 12 and 13 are pivotally secured by pins 12a and 13a to the bracket 3' and are provided with rearwardly projecting arms 12b and 13b which cross and are resiliently forced inwardly to their closed-jaw position (full line, Fig. 5) by a compression spring 15. As shown in phantom in Figs. 4 and 5, the jaws 12 and 13 are held in their open positions prior to positioning of the bottle B against the centering plate 11 by the upper and greater diameter portion of a conical cam member 16 secured on a vertical shaft 17 which is vertically reciprocated by a second air motor 18 (Fig. 2).

Air or other pressure medium is suplied to the motor 18 from the pressure line 10 through a two-way valve 19 which is operated by a lever 20 responsive to a collar 21 adjustably secured on the rod 6. As the rod moves towards its uppermost position in which the bottle B is positioned against the centering plate 11, the valve 19 operates to supply air to the motor 18 so that the shaft 17 is raised. As shown in Fig. 2, the line 10 preferably is provided with a pressure regulator 42 for presetting the pressure exerted to operate the motors 7 and 18.

Upward movement of the rod 17 acts through lever 22 to lower a rod 23 having on its lower end a pressure foot 24 which engages and forces the closure plug C successively to a preselected heating position and thereafter firmly into sealing position in the neck of the bottle B.

As shown in Fig. 4, the lever 22 is pivotally secured at 25 to the frame 3 and is pivotally connected at its rear end to a block 26 which is slidably mounted on the rod 17. A compression spring 27 coiled about the rod 17 beats on a collar 28 which is adjustably secured to the rod and presses the block 26 upwardly toward adjustable stop and lock nuts 29 on the upper end of the rod 17.

The rod 23 is supported for axial movement vertically in a bearing bracket portions 3a of the frame 3 and is provided at its upper end with a yoke 30 having a pin 31 located in the slotted front end of the lever 22 so that pivotal movement of the lever responsive to upward and downward movement of the rod 17 effects movement of the pressure rod 23 in the opposite direction. Thus, when the rod 17 is raised by the air motor 18, the rod 23 is lowered and the pressure foot 24 on its lower end engages and forces the closure plug C to a preselected position (Fig. 6) at which an annular shoulder 40 of the plug is spaced a preselected distance from the lip or top surface 41 of the bottle against which it subsequently is to be pressed and sealed. Downward travel of the rod 23 is interrupted at the preselected pressure foot position (Fig. 6) by a pivoted latching pawl 32 which engages a stop portion 33 of the yoke 30 (Fig. 4). Concurrently a pin 34 projecting from the yoke 30 engages and swings a lever 35 pivotally mounted on a microswitch bracket rearwardly so as to engage and close the microswitch 36 which thereupon energizes and opens a solenoid operated air valve 37 (Figs. 2 and 3) thereby introducing air through line 38 to a labyrinth heater 39 from which the heated air is directed, as shown in Figs. 6 and 8, through a nozzle, generally designated 49, against the portions of the closure and bottle to be sealed. Current is supplied to the heater 39 by a snap switch (Figs. 1 and 3) and the operating temperature preselected by adjustment of the selector 51 of a thermostatic controller 52, the dial 53 of which indicates the selected temperature.

As shown in Figs. 6 and 8, the heated air is directed by the nozzle 49 tangentially against the closure and slightly upwardly against the under-surface of the annular shoulder 40 from an annular nozzle discharge orifice 54 fed by a plurality of nozzle passages 54a. The nozzle outlet 54 is formed in part by the bottom of a conical member 55 which may be adjusted by interchange of supporting shims 54b of different sizes to vary the width of the outlet 54. The heated air is directed cyclonically about the heated portion of the closure C so that its periphery is uniformly heated. Frequently, the outlet 54 is spaced slightly above the lip 41 of the bottle, as shown in Fig. 6, so that the lip is less intensely heated than the closure shoulder 40 and the cylindrical portion of the closure directly below and adjacent thereto.

The closure is rendered thermoplastic and sealable by heating in the described manner for a period of time, the length of which may be preselected by adjustment of a timer, generally designated 56. At the end of the selected time, the timer 56 deenergizes and thereby closes the solenoid operated valve 37 thus discontinuing the flow of heated air through the heater 39 to the nozzle outlet 54. Concurrently, the timer 56 energizes a solenoid 57 (Fig. 4) which operates through connecting rod 58 to retract the latching pawl 32 which releases the yoke stop 33 and permits the loaded spring 27 to force lever block 26 upwardly toward the stop nut 29 thereby driving the pressure rod 23 and foot 24 downwardly to seat the thermoplastically heated shoulder 40 of the closure C firmly against the bottle lip 41, as shown in Fig. 7, where they cool and set or harden in an intimately joined weld or seal.

The general operation of the heat sealer is apparent from the foregoing description and is hereinafter reviewed with a description of the adjustment features provided in the illustrated embodiment.

The switch 50 is snapped on thereby energizing the heater H, the energization preferably being visually indicated as by means of a lamp bull's-eye 59. Time should be permitted to bring the heater to the temperature selected by adjustment of the thermostatic controller 52. The preferred temperatures will vary for different thermoplastic materials and can best be determined by trial adjustment of the selector until the best setting is found. In the case of polyethylene, a good initial trial setting is in the neighborhood of 600° F.

At approximately that temperature, the timer 56 can advantageously be set for about a half second heating period with further adjustment being made so as to shorten the period in so far as is permitted by good sealing experience.

When the machine is up to temperature, the plug C is placed in the bottle B so that at least the portions requiring heating (Fig. 6) are exposed.

The assembly is then placed on the lifter 5 and foot pedal 8 depressed thereby opening the valve 9 and causing the motor 7 to raise the bottle while manually held against the guide 4 to a point where the bottle shoulder bears against the centering plate 11 and the bottle neck extends upwardly through the centering plate and between the jaws 12 and 13 with the plug C positioned inside the circular hot-air nozzle 49.

Preferably, as shown in Fig. 4, the lifter 5 has a lost motion spring connection to the rod 6 to accommodate for slight differences in heights of the bottles B raised against the centering plate 11. It will be appreciated that the conical nozzle member 55, the gripping jaws 12 and 13, the centering plate 11, the guide plate 4 and the bottle and plug should all be accurately aligned relative to the center line of the pressing foot plunger rod 23 by suitable adjustment of their respective fastener screws and bolts.

The collar 21 which operates the valve lever 20 (Fig. 2) is adjusted on the rod so that the valve 19 is opened and the raising of the rod 17 is timed so that the conical cam 16 clears the jaw operating arms 12b, 13b and the jaws 12 and 13 close just after the arrival of the bottle shoulder or groove 14 in jaw-gripping position. Thereafter, further upward travel of the rod 17 pivots the lever 22 so as to lower the plunger rod 23 and cause the yoke stop 33 to engage the latching pawl 32, at which position the pressure foot 24 pushes the plug C to the preselected heating position in the bottle selected by adjustment of nut 60 and the distance the foot 24 extends below the rod 23.

The height of the microswitch is set and secured by tightening screws 61 so that the switch is immediately closed by rearward movement of the lever 35 responsive to the pin 34 while the closure C is pressed to its Fig. 6 position.

Further upward movement of the rod 17 loads the spring 27 so that upon retraction of the latching pawl 32 by the solenoid 57 responsive to the timer 56, the spring 27 forces the lever block 26 upwardly toward the adjusted stop nut 29 and the closure C is driven home as shown in Fig. 7 under a predetermined load which is determined by the position at which the spring collar 28 is secured.

Concurrently, with retraction of the latching pawl, the timer 56 deenergizes the solenoid of valve 37 and the valve closes thereby discontinuing flow of air through the line 38 and the heater 39 to the nozzle 49.

Thereafter pressure on the foot pedal 8 may be relieved whereupon the two-way valve 9 is actuated to reconnect the pressure line 10 with the air motor 7 so that the latter retracts the rod 6 and the lifter 5. The lever 20 turns clockwise (Fig. 2) as the collar 21 is lowered and actuates the two-way valve 19 so that the motor 18 retracts the rod 17 and thereby raises the pressure foot 24. The lever 35 swings counterclockwise (Fig. 4) as the pin 34 on the yoke 30 rises thereby opening the microswitch 36 and deenergizing the latch solenoid 57 so that the latch 32 is swung clockwise from its phantom position shown in Fig. 4 by a spring 65 to its stop-engaging position shown in full line. Finally cam 16 opens the jaws 12 and 13 and the sealed container and closure are removed preparatory to repeating the cycle.

Fig. 9 illustrates a modified form of lifter 5' and pressure foot 24' with which to adapt the above-described apparatus to heat seal a bottom closure C' in the open bottom of a bottle of phial B'. The illustrative embodiment of the phial B' has an outward conical taper toward its open lip 41' and a conforming taper to the bottom shoulder 40' of the closure C'. The phial is supported in an inverted position by the lifter 5' which is conformingly recessed to center and provides lateral as well as axial support for the phial. It will be seen that the centering plate and bottle guide 4 are not required with this type of lifter and are undesirable because of the outward taper of the phial.

The gripping jaws 13' serve to provide further lateral support and may be dispensed with if such support is found unnecessary.

The remaining apparatus and operation of the modification shown in Fig. 9 is otherwise the same as that shown in and heretofore described with reference to Figs. 1–8.

It is a feature of the present invention, that the closure C be sufficiently large so that it does not drop into the neck of the bottle B. When the heated preselected portion of the closure is pressed snugly into the bottle neck, the latter may scrape or plow off a thin layer of the heated and softened surface of the closure plug and distribute the scraped material between the generally conforming heated surfaces 40 and 41 when the latter are pressed together into sealed engagement. The softened material also fills any voids resulting from slight disconformities in the generally conforming surfaces so that the upper portion of the bottle neck closely conforms to the contiguous portion of the closure C adjacent the sealed together surfaces 40 and 41.

The invention is susceptible of other adaptations and embodiments which will be apparent to those skilled in the art.

We claim:

1. Apparatus for heat sealing an organic thermoplastic closure member on a conforming open end of a thermoplastic tubular member which comprises means for holding in preselected spaced relation conforming surfaces of said members which are to be united by heat sealing, means for non-engageably heating and softening each said surface of each of said members substantially uniformly with heated gas only and free from contact with solid members, and means for thereafter pressing the softened conforming portions into a united sealing engagement and for holding said portions in sealing engagement until the heated portions have cooled and set.

2. The apparatus recited in claim 1 and wherein said heating means is adapted to heat the substantially uniformly heated conforming portion of one of said members a greater amount than the uniformly heated conforming portion of the other of said members.

3. Apparatus for heat sealing an organic thermoplastic closure on a conforming open end of a thermoplastic tubular section which comprises means for moving the tubular section into sealing position, operable means for gripping the section when it reaches said position, means for pressing the closure to an initial preselected position in said section, means for non-engageably heating and softening the conforming portions of said closure and section in said initial preselected position, and means for only thereafter forcing said closure into conforming sealed engagement with said section.

4. Apparatus for heat sealing an organic thermoplastic closure on a conforming open end of a thermoplastic tubular section which comprises means for holding the tubular section in sealing position, means for pressing the closure to an initial preselected heating position relative to said section, means for non-engageably heating the conforming portions of said closure and said section in said initial preselected position, means for only thereafter forcing said heated closure into conforming sealing engagement with said section in said sealing position, and timing means for discontinuing the heating when said force applying means are actuated.

5. Apparatus for heat sealing a shoulder of a generally cylindrical organic thermoplastic closure plug against the lip of a substantially conforming thermoplastic tubular section which comprises means for moving the tubular section to a sealing position, means for centering the section in said position, operable means for gripping the section when it reaches said position, means for pressing the closure plug to an initial preselected position in said section, a conical nozzle disposed about said sealing position, said nozzle being adapted to direct heated air in a cyclonic path about and against the closure plug, means for supplying heated air through said nozzle to heat said plug when said plug is in said initial preselected position, force means for thereafter pressing said heated plug to said sealing position, adjustment means for preselecting the force with which said force means presses said closure to said sealing position, and timing means for discontinuing the supply of heated air to said nozzle and for concurrently actuating said force means to press said plug into sealed engagement with said section at said sealing position.

6. The method of heat sealing a shoulder of a thermoplastic closure plug within the bore and against the lip of a substantially conforming thermoplastic tubular section which comprises pressing the plug into said bore with the shoulder a preselected distance from the lip, heating and softening only with hot gases the exposed portion only of the plug and the opposing faces only of the shoulder and lip, pressing the plug into sealing position wherein the shoulder substantially conforms to and engages the lip, and thereby substantially concurrently plowing with the lip a softened portion of the plug against the shoulder and filling with said softened plastic voids between the closure plug and the bottle.

7. The method of heat sealing abutting surfaces of thermoplastic articles which comprises heating and superficially softening said articles by direct contact with hot gases only, positively pressing one of said articles into the other of said articles sufficiently to scrape and plow with one of said articles a softened surface portion of the other of said articles into a position between said abutting surfaces, and further pressing and sealing said abutting surfaces together with said softened plastic sandwiched therebetween.

References Cited in the file of this patent

UNITED STATES PATENTS

| | | |
|---|---|---|
| 2,084,625 | Stebbins et al. | June 22, 1937 |
| 2,157,732 | Piazze | May 9, 1939 |
| 2,220,545 | Reinhardt | Nov. 5, 1940 |
| 2,319,683 | Hofmann | May 18, 1943 |
| 2,367,725 | Lindh et al. | Jan. 23, 1945 |
| 2,383,230 | Voke | Aug. 21, 1945 |
| 2,403,995 | Peters | July 16, 1946 |
| 2,411,660 | Manning | Nov. 26, 1946 |
| 2,488,212 | Lloyd | Nov. 15, 1949 |
| 2,546,208 | Barton | Mar. 27, 1951 |
| 2,584,095 | Slaughter | Jan. 29, 1952 |
| 2,588,604 | Archer | Mar. 11, 1952 |
| 2,597,704 | Carlson | May 20, 1952 |
| 2,647,555 | Hinman | Aug. 4, 1953 |
| 2,681,097 | Gray | June 15, 1954 |

FOREIGN PATENTS

| | | |
|---|---|---|
| 653,211 | Great Britain | May 9, 1951 |